Patented July 4, 1950

2,514,168

UNITED STATES PATENT OFFICE 2,514,168

DERIVATIVES OF DIHYDROPYRAN AND PREPARATION OF THE SAME

Curtis W. Smith and Douglas G. Norton, Berkeley, and Seaver A. Ballard, Orinda, Calif., assignors to Shell Development Company, San Francisco, Calif., a corporation of Delaware No Drawing. Application June 2, 1947,
Serial No. 751,980

30 Claims. (Cl. 260—333)

1

This invention relates to a method of synthesizing derivatives of dihydropyran and to new derivatives of dihydropyran. More particularly, the present invention relates to the preparation of and a method for the preparation of derivatives of 3,4-dihydro-1,2-pyran by a process comprising reacting an alpha,beta-unsaturated carbonylic compound of the group consisting of the alpha,-beta-unsaturated aldehydes and ketones with a dissimilar organic compound containing an olefinic linkage interconnecting two carbon atoms both of which are separated by at least one intervening atom from any additional olefinic and any acetylenic carbon atoms that the molecule may contain. The invention relates further to new derivatives of 3,4-dihydro-1,2-pyran which may be prepared by the process of the invention, as polymerizable and otherwise useful compositions of matter, to the polymerization of such polymerizable derivatives, and to the novel products of the polymerization.

An object of the present invention is new and useful chemical compounds, particularly new and useful derivatives of 3,4-dihydro-1,2-pyran. Another object of the invention is a new method for the synthesis of derivatives of 3,4-dihydro-1,2-pyran, particularly by the reaction of an alpha,-beta-unsaturated carbonylic compound of the above-defined group with a dissimilar organic compound which contains a pair of carbon atoms interconnected by an isolated olefinic bond, i. e., an olefinic bond that is in other than conjugate relation to any additional olefinic and any acetylenic bonds that may be present in the molecule. Another object of the invention is reaction conditions and manipulative procedures that favor the desired reaction. Further objects of the invention are new derivatives of dihydropyran that are valuable, among other reasons, as improved raw materials for the preparation of resins and other products of polymerization reaction, and the new polymeric materials that are obtainable by their polymerization. Other objects of the invention will become apparent hereinafter.

The foregoing and related objects of the invention have been accomplished by reacting an unsaturated carbonylic compound of the group consisting of the unsaturated aldehydes and ketones wherein the carbonylic carbon atom is directly attached by a univalent bond to at least one olefinic carbon atom, with a dissimilar unsaturated organic compound that contains at least one interconnected pair of olefinic carbon atoms both of which are separated by at least one intervening atom from any additional olefinic and any acetylenic carbon atoms that the molecule may contain, at a reaction temperature and under conditions which favor the desired reaction between the reactants to form a derivative of 3,4-dihydro-1,2-pyran. The desired reaction may be effected by heating a suitable mixture of the unsaturated carbonylic compound with the dissimilar olefinically unsaturated compound that is to be reacted therewith, to an effective reaction temperature under conditions which minimize polymerization of the reactants, for sufficient time. The process preferably is executed in the presence of an effective amount of a polymerization inhibitor, or antioxidant, that is effective in reducing, or preventing the polymerization of polymerizable olefinically unsaturated compounds. The reaction may be effected by means of either a batchwise, an intermittent, or a continuous type of process. According to the generic concepts of the invention, the reaction may be effected with the reactants in either the liquid state or the gaseous state. However, the reactants preferably are maintained in the liquid state, as may be accomplished by maintaining the reaction mixture during the reaction under sufficiently elevated pressures. The elevated pressures may be either autogenous or they may be applied by introduction of a suitable inert gas into the reaction vessel in an amount sufficient to provide the desired pressure. After the heating step, the reaction mixture may, if desired, be subjected to any suitable treatment leading to its separation into its components and to recovery of the desired product of the reaction, fractional distillation generally being the most convenient, but not the only treatment to this end.

A wide variety of substituted 3,4-dihydro-1,2-pyrans have been prepared by the process of the invention executed in a manner substantially as described above.

In its broadest concepts the present invention is generic to the preparation of derivatives of 3,4-dihydro-1,2-pyran by reaction of the alpha,beta-unsaturated aldehydes and ketones with unsaturated organic compounds that are dissimilar thereto and that contain a pair of interconnected olefinic carbon atoms that is separated by at least one intervening atom from any additional olefinic and any acetylenic carbon atoms that the molecule may contain. The unsaturated aldehydes and ketones with which the present invention is concerned in its generic aspects are those unsaturated aldehydes and ketones that contain at least one pair of carbon atoms connected by an olefinic bond, one of which is directly attached by a univalent bond to the carbon atom of the carbonyl group. The alpha,beta-olefinically unsaturated aldehydes and ketones may be defined as those unsaturated aldehydes and ketones that contain the grouping of atoms represented in the formula

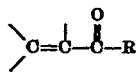

the carbon-to-carbon multiple bond being one of non-aromatic character. The olefinic bond may be contained in an open chain group of atoms, or it may form part of a non-aromatic carbocyclic or heterocyclic group of atoms which may or may not include the carbon atom of the carbonyl group. In the alpha,beta-olefinically unsaturated aldehydes, R represents an atom of hydrogen bonded to the carbon atom of the carbonyl group; in the alpha,beta-olefinically unsaturated ketones, R represents a hydrocarbon group, which may be unsubstituted or substituted, bonded to the carbon atom of the carbonyl group by a carbon-to-carbon bond.

The invention in its broadest aspects is generic to the preparation of derivatives of 3,4-dihydro-1,2-pyran by reaction of the alpha,beta-olefinically unsaturated aldehydes and ketones with any dissimilar organic compound that contains an interconnected pair of olefinic carbon atoms both of which are separated by at least one intervening atom from any additional olefinic and any acetylenic carbon atoms that the molecule may contain. The invention in its generic concepts is contemplated as including the preparation of derivatives of 3,4-dihydro-1,2-pyran by the reaction of the alpha,beta-unsaturated aldehydes and ketones of the herein defined class with any of a wide variety of olefinic reactants that are dissimilar thereto and that have the above defined characteristic. These olefinic reactants which may be reacted with the alpha,beta-unsaturated aldehydes and ketones of the herein defined class according to the invention all are dissimilar thereto in the sense that they contain a characteristic functional grouping which differs from a conjugated functional grouping defined by the formula

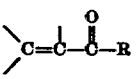

R having its previous significance, that is characteristic of the alpha,beta-olefinically unsaturated aldehydes and ketones. Stated otherwise, the olefinic reactants which may be cause to react with alpha,beta-olefinically unsaturated aldehydes and ketones according to the objects of the invention, contain an olefinic bond that is neither in a conjugated system of carbon-to-carbon multiple bonds nor in conjugate relation to an aldehydic or ketonic carbonyl group. Each of the olefinic carbon atoms is attached to three separate atoms. Among the numerous compounds within this generic class of compounds which may be caused to react with an unsaturated carbonylic compound containing the previously defined structural unit,

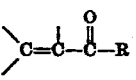

to form derivatives of 3,4-dihydro-1,2-pyran, are included, among others, olefinic hydrocarbons; halogen-substituted olefinic hydrocarbons; nitro-substituted olefinic hydrocarbons; salts of olefinic carboxylic acids; olefinic carboxylic acid amides; esters of olefinic carboxylic acids, and their sulfur-containing analogs; carboxylic acid esters of olefinic alcohols, and their sulfur-containing analogs; olefinic nitriles; olefinic amines, including amines wherein the amino nitrogen atom is attached to an olefinic carbon atom; ethers wherein one or both of the organic radicals attached to ethereal oxygen atom contains an olefinic bond; olefinic acetals and thioacetals; heterocyclic compounds containing an olefinic bond either in the heterocyclic ring, or in a side chain which may be attached either to a carbon atom in the heterocyclic ring or to an atom of an element other than carbon, e. g., nitrogen, in the heterocyclic ring; olefinic sulfides; olefinic thiones; olefinic sulfones; and the like. The examples which are presented hereinafter illustrate the preparation of derivatives of 3,4-dihydro-1,2-pyran by the reaction of alpha,beta-olefinically unsaturated aldehydes and ketones with a wide variety of olefinic compounds of the herein defined class.

When an alpha,beta-unsaturated carbonylic compound of the herein defined group is reacted according to the process of the invention with a dissimilar olefinic compound of the above-defined class, there is formed a derivative of 3,4-dihydro-1,2-pyran in which the extra-nuclear atoms or groups of atoms that are attached to the carbon atom in the 2-position of the dihydropyran ring correspond to the atoms or groups of atoms that were attached to one of the olefinic carbon atoms in the second-mentioned, olefinic reactant. It thus will be apparent from the foregoing that a wide variety of derivatives of 3,4-dihydro-1,2-pyran wherein the carbon atom in the 2-position of the dihydropyran ring is substituted, that is, is attached to at least one extra-nuclear atom other than hydrogen, may be prepared by the process to which the invention relates. Certain of the compounds which thus may be prepared could not readily be prepared otherwise. Derivatives of dihydropyran which may be prepared by the process of the invention include compounds which are believed to be novel and which, in many cases, are of improved value as chemical intermediates, as solvents, as biologically active materials, as raw materials for the preparation of resins, and in other useful applications. Certain of these compounds, particularly 2-(3,4-dihydro-1,2-pyranyl) ethers, form the subject matter of one of the more limited aspects of the present invention.

The following examples will illustrate certain of the numerous possible specific embodiments of the invention, and also will indicate the generic implications of the invention as regards the numerous compounds that may be employed as reactants therein. In the examples, the parts are by weight

*Example I. Reactants: Acrolein and vinyl isobutyl ether.*—A mixture of 436 parts of acrolein and 794 parts of vinyl isobutyl ether (equimolar quantities) containing 0.03% by weight of hydroquinone was placed in a nickel-lined, pressure-resistant reaction vessel equipped with an internally-located coil of tubing through which fluid cooling and heating media could be passed. The vessel was closed and the contents were heated rapidly to 100° C. with steam passed through the coiled tubing, and then to 185° C. over a period of about an hour. The mixture was maintained at 185° C. for an additional hour, and then was cooled rapidly by passing tap-water through the coiled tubing. The mixture then was removed tilled from a 20-plate bubble-plate fractionating column. From 1227 parts of the reaction mixture, the following fractions were separated:

| | Boiling Range °C. | Pressure Mm. Hg | Amount Parts |
|---|---|---|---|
| A | 50–83 | 760 | 128 |
| B | 85–100.5 | 100 | 15 |
| C | 101–109 | 100 | [1] 1,063 |
| D | Bottoms | | 24 |

[1] Over 90% of this fraction distilled at 109° C.

Fractions A and B were found to consist predominantly of unreacted acrolein and unreacted vinyl isobutyl ether, along with minor amounts of unidentified products of side reaction. Fraction C was identified as 2-(3,4-dihydro-1,2-pyranyl) isobutyl ether (alternatively, 2-isobutoxy-3,4-dihydro-1,2-pyran), having the following structure

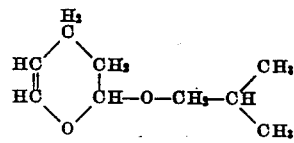

The 2-(3,4-dihydro-1,2-pyranyl) isobutyl ether was a colorless liquid having a minty odor. It was found to have a boiling point of 177° C. under a pressure of 760 mm. Hg, a refractive index $(n_D^{20})$ of 1.4374, and a specific gravity (20/4) of 0.9225. In this experiment, the following analyses of the product were obtained: 68.84% C and 10.38% H; calculated for $C_9H_{16}O_2$, 69.19% C and 10.32% H.

Upon fractional distillation of the bottoms from the above distillation, there was recovered a small amount of a product distilling at 74° C., under a pressure of 0.05 mm. Hg and believed to be the compound having the structure

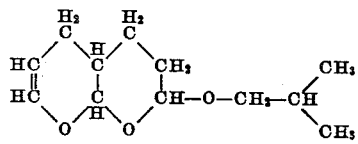

formed by reaction of acrolein with the 2-(3,4-dihydro-1,2-pyranyl) isobutyl ether that was the principal product of the experiment. This product was analyzed and found to contain 77.90% C and 7.47% H, compared to the values of 77.75% C and 7.46% H calculated for the above structure.

*Example II. Reactants: Acrolein and methyl methacrylate.*—A mixture of acrolein and methyl methacrylate in equimolar proportions, containing 1% by weight of hydroquinone, was rapidly heated in a sealed glass-lined reaction vessel to 180° C., and maintained at this temperature for 1 hour. The mixture then was cooled rapidly and fractionally distilled. The methyl ester of 2-methyl-3,4-dihydro-1,2-pyran-2-carboxylic acid (alternatively, 2-methyl-2-carbomethoxy-3,4-dihydro-1,2-pyran) having the structure

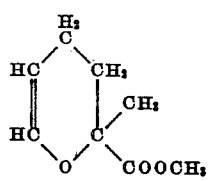

was recovered as the fraction distilling at 119° C. to 120° C. under a pressure of 100 mm. Hg, in a yield of 74% based on the methyl methacrylate consumed and 56% based on the acrolein consumed, and in a conversion of 42%. The sample of this compound that was prepared in this experiment was found to have a refractive index $(n_D^{20})$ of 1.4549 and a specific gravity (20/4) of 1.0773. Analyses were as follows: found, 61.50% C and 7.75% H; calculated for $C_8H_{12}O_3$, 61.51% C and 7.76% H.

*Example III. Reactants: Methacrolein and alpha-methylstyrene.*—An equimolar mixture of methacrolein and alpha-methylstyrene containing 1% by weight of hydroquinone was heated in the manner employed in Example II at 175° C. for 1 hour. Upon distillation of the resultant mixture, 2,5-dimethyl-2-phenyl-3,4-dihydro-1,2-pyran, having the structure:

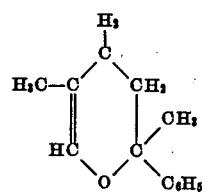

was recovered as the fraction distilling at 72° C. to 74° C. under a pressure of 1 mm. Hg, in a yield of 52% based upon the amount of alpha-methylstyrene consumed and in a conversion of 11%. The sample of 2,5-dimethyl-2-phenyl-3,4-dihydro-1,2-pyran that was prepared in this experiment had a refractive index $(n_D^{20})$ of 1.5280 and a specific gravity (20/4) of 1.0085. Analyses were as follows: found, 82.6% C and 8.9% H; calculated for $C_{13}H_{16}O$, 82.94% and 8.57% H.

*Example IV. Reactants: Crotonaldehyde and methyl vinyl ether.*—A mixture consisting of equimolar quantities of crotonaldehyde and methyl vinyl ether was heated at 225° C. for 3 hours in the manner employed in Example II. Upon distillation of the resultant mixture, 2-(4-methyl-3,4-dihydro-1,2-pyranyl) methyl ether (alternatively, 2-methoxy-4-methyl-3,4-dihydro-1,2-pyran) having the structure:

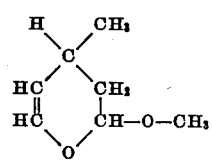

was recovered as the fraction distilling at 79° C. to 81° C. under a pressure of 100 mm. Hg in a yield of 91% based on the methyl vinyl ether consumed and 84% based on the crotonaldehyde consumed, and in a conversion of 64%. The sample of this compound prepared in this experiment was found to have a refractive index $(n_D^{20})$ of 1.4400 and a specific gravity (20/4) of 0.9629. Analyses were as follows: found, 65.27% C and 9.45% H; calculated for $C_7H_{12}O_2$, 65.59% C and 9.44% H.

An additional fraction distilling at 76° C. to 77° C. under a pressure of 20 mm. Hg was separated in an amount corresponding to a 3% conversion of the initial reactants. This product is believed to have the structure of 2-methoxy-4,5-dimethyl-2,3,4,4a,5,8a-hexahydro-1,8-dioxanaphthalene, i. e.

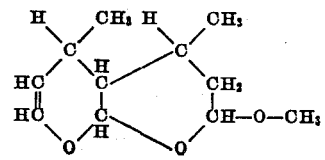

and to have been formed by the reaction of one molecule of crotonaldehyde with one molecule of the substituted dihydropyranyl methyl ether that was obtained as the principal product of the experiment. This latter product was found to have a refractive index ($n_D20$) of 1.4572 and a specific gravity (20/4) of 0.9644. It was found to contain 65.69% C and 9.10% H (calculated for $C_{11}H_{18}O_3$, 66.64% C and 9.15% H).

*Example V. Reactants: Acrolein and divinyl ether.*—A mixture of equimolar quantities of acrolein and divinyl ether containing 0.03% by weight of hydroquinone, was heated at 185° C. for 2 hours according to the method of Example II, and the resultant mixture was fractionally distilled. The fraction distilling at 68° C. to 70° C. under a pressure of 50 mm. Hg was separated and identified as 2-(3,4-dihydro-1,2-pyranyl) vinyl ether (alternatively 2-vinoxy-3,4-dihydro-1,2-pyran) having the structure

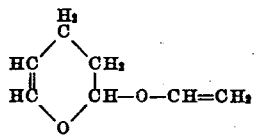

This product, formed by the reaction of one molecule of acrolein with one molecule of divinyl ether, was recovered in a conversion of 30% based on the amount of acrolein employed. A second fraction distilling at 95° C. to 100° C. under 10 mm. Hg pressure was identified as bis-2-(3,4-dihydro-1,2-pyranyl) ether having the structure

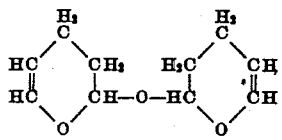

This compound, corresponding to the product of reaction of two molecules of acrolein with one molecule of divinyl ether, was recovered in a conversion of 45%. The samples of these compounds prepared in this experiment were found to have the following characteristics

|  | 2-(3,4-dihydro-1,2-pyranyl) vinyl ether | bis-2-(3,4-dihydro-1,2-pyranyl) ether |
|---|---|---|
| Refractive index ($n_D{30}$) | 1.4659 | 1.4846 |
| Specific gravity (20/4) | 1.0391 | 1.1063 |
| Percent C, found | 65.5 | 65.75 |
| Percent C, calculated | 66.6 | 65.91 |
| Percent H, found | 7.73 | 7.76 |
| Percent H, calculated | 7.99 | 7.75 |

*Example VI. Reactants: Acrolein and methyl vinyl ether.*—A mixture of equimolar quantities of acrolein and methyl vinyl ether containing 0.03% by weight of hydroquinone was heated to 180° C. for 2 hours. Distillation of the resultant mixture led to the recovery, in a conversion of 84% and in yields of 98% based on the methyl vinyl ether consumed and 88% based on the acrolein consumed, of 2-(3,4-dihydro-1,2-pyranyl) methyl ether (alternatively, 2-methoxy-3,4-dihydro-1,2-pyran), having the structure

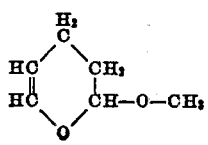

This ether was found to have a boiling point of 127.6° C. under a pressure of 760 mm. Hg, a refractive index ($n_D{20}$) of 1.4423, and a specific gravity of 1.0013. In this experiment, the product was found to contain 63.09% C and 8.86% H (calculated for $C_6H_{10}O_2$, 63.13% C and 8.83% H).

*Example VII. Reactants: Acrolein and isobutylene.*—A mixture of equimolar amounts of acrolein and isobutylene containing 0.5% hydroquinone was heated under autogenous pressure for 2 hours at 220° C., and then distilled. 2,2-dimethyl-3,4-dihydro-1,2-pyran was recovered in a conversion of 12% and in a yield of 72% based on the amount of isobutylene consumed, as the fraction distilling at 52° C. to 58° C. under a pressure of 100 mm. Hg. The product was found to contain 74.70% C and 10.76% H (calculated for $C_7H_{12}O$, 74.95% C and 10.79% H).

*Example VIII. Reactants: Acrolein and vinyl acetate.*—A mixture of equimolar amounts of acrolein and vinyl acetate containing 0.5% of hydroquinone was heated according to the method of Example II, at 215° C. for 2 hours. Distillation of the resultant mixture led to the recovery, in a yield of 63% based on the vinyl acetate consumed and in a conversion of 9%, of the acetate of 3,4-dihydro-1,2-pyran-2-ol (alternatively, 2-acetoxy-3,4-dihydro-1,2-pyran) having the structure:

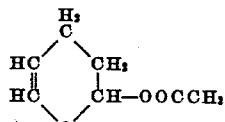

This ester distilled at 77° C. to 78° C. under a pressure of 20 mm. Hg.

*Example IX. Reactants: Cinnamaldehyde and vinyl isobutyl ether.*—A mixture of equimolar quantities of cinnamaldehyde and vinyl isobutyl ether containing 1% of hydroquinone was heated according to the method of Example II for 1 hour at 210° C. Fractional distillation of the resultant mixture led to the recovery, in yields in excess of 90% based upon the amount of the reactants consumed, and in a conversion of 9%, of 2-(4-phenyl-3,4-dihydro-1,2-pyranyl) isobutyl ether (alternatively, 2-isobutoxy-4-phenyl-3,4-dihydro-1,2-pyran) having the structure

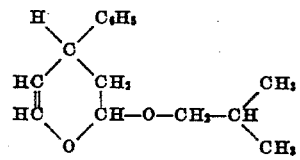

This ether distilled at 85° C. to 86° C. under a pressure of 0.5 mm. Hg. It was found to have a refractive index ($n_D{20}$) of 1.5133.

*Example X. Acrolein and substituted isobutylenes.*—Acrolein and dimethallyl ether reacted in an equimolar mixture at 200° C. in the liquid state in 1.5 hours to form in a low conversion 2-methyl-2-[(2-methylalloxy)methyl]-3,4-dihydro-1,2-pyran having a boiling point of 63° C. to 66° C. under a pressure of 1 mm. Hg. Acrolein and methallyl acetate reacted under similar conditions to form the acetate of 2-methyl-3,4-dihydro-1,2-pyran-2-methanol in a conversion of about 9%.

*Example XI. Reactants: Methacrolein and methyl methacrylate.*—Methacrolein and methyl methacrylate, when reacted according to the method of Example II in the presence of 1% of hydroquinone at 170° C. for 1 hour, formed the methyl ester of 2,5-dimethyl-3,4-dihydro-1,2-pyran-2-carboxylic acid, having the structure

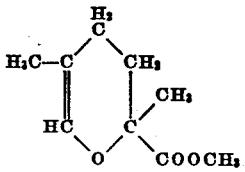

in a yield of 57 per cent based upon the methyl methacrylate consumed and 37% based upon the methacrolein consumed, and in a conversion of 16%. Analyses: found, 63.18% C and 8.25% H; calculated for $C_9H_{14}O_3$, 63.51% C and 8.10% H.

*Example XII. Acrolein and phenyl vinyl sulfide.*—A mixture of equimolar quantities of acrolein and phenyl vinyl sulfide containing 0.03% hydroquinone was heated according to the method of Example II for 1 hour at 200° C. Distillation of the resultant mixture led to the recovery of 2-(3,4-dihydro-1,2-pyranyl) phenyl sulfide, having the structure

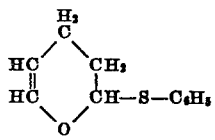

in a yield of 98% based on the phenyl vinyl sulfide consumed and 77% based upon the acrolein consumed. The conversion was 77%. The product distilled at 125° C. under a pressure of 5 mm. Hg and was found to have a refractive index ($n_D^{20}$) of 1.5844 and a specific gravity (20/4) of 1.1364. Analyses: found, 68.70% C and 6.33% H; calculated for $C_{11}H_{12}SO$, 68.71% C and 6.29% H.

*Example XIII. Reactants: Acrolein and 1-hexene.*—A mixture of equimolar quantities of acrolein and 1-hexene was heated according to the method of Example II in the presence of 0.03% of hydroquinone to 180° C. to 210° C. for 3 hours. The resultant mixture was distilled. 2-n-butyl-3,4-dihydro-1,2-pyran was recovered in a yield of 8% based on the acrolein consumed and in a conversion of 7%, as the fraction distilling at 60° C. under a pressure of 14 mm. Hg.

*Example XIV. Reactants: Acrolein and methyl acrylate.*—Acrolein and methyl acrylate, when reacted at 195° C. for 1 hour in the presence of 1% of hydroquinone according to the method of Example II, formed the methyl ester of 3,4-dihydro-1,2-pyran-2-carboxylic acid (alternatively 2-carbomethoxy-3,4-dihydro-1,2-pyran) in a yield of 8% based upon the amount of methyl acrylate consumed and in a conversion of 3%. Analyses: found, 59.57% C and 7.18% H; calculated for $C_7H_{10}O_3$, 59.14% C and 7.09% H.

*Example XV. Reactants: Acrolein and 2,4,4-trimethyl-1-pentene.*—A mixture of equimolar amounts of acrolein and 2,4,4-trimethyl-1-pentene containing 0.5% hydroquinone, was heated to 200° C. for 2.5 hours according to the method of Example II. The resultant mixture was distilled. 2-methyl-2-neopentyl-3,4-dihydro-1,2-pyran, distilling at 106° C. to 109° C. under a pressure of 50 mm. Hg and having a refractive index ($n_D^{20}$) of 1.4549, was recovered in a yield of 42% based on the amount of the olefin consumed and in a conversion of 9%. Analyses: found, 78.35% C and 11.92% H; calculated for $C_{11}H_{20}O$, 78.51% C and 11.98% H.

*Example XVI. Reactants: Crotonaldehyde and alpha-methylstyrene.*—Crotonaldehyde and alpha-methylstyrene, when reacted for 1.5 hours at 216° C. in the presence of 1% of hydroquinone according to the method of Example II, formed 2,4-dimethyl-2-phenyl-3,4-dihydro-1,2-pyran, distilling at 69° C. to 71° C. under a pressure of 1 mm. Hg, in a yield of 70% based on the amount of the alpha-methylstyrene consumed, and in a conversion of 18%. The dihydropyran derivative was found to have a refractive index ($n_D^{20}$) of 1.5252 and a specific gravity (20/4) of 1.0031. Analyses: found, 82.23% C and 8.59% H calculated for $C_{13}H_{16}O$, 82.93% C and 8.57% H.

*Example XVII. Reactants: Methyl vinyl ketone and vinyl isobutyl ether.*—Methyl vinyl ketone and vinyl isobutyl ether were mixed in equimolar quantities and heated in the presence of 1% of hydroquinone to 190° C. for 0.5 hour according to the method of Example II. Distillation of the resultant mixture led to the recovery of 2-(6-methyl-3,4-dihydro-1,2-pyranyl) isobutyl ether (alternatively, 2-isobutoxy-6-methyl-3,4-dihydro-1,2-pyran), having the structure

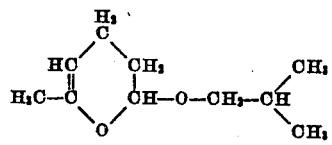

in good yield and conversion, as the fraction distilling at 117° C. to 119° C. under a pressure of 100 mm. Hg. This ether was found to have a refractive index ($n_D^{20}$) of 1.4387 and a specific gravity (20/4) of 0.9155. Analyses: found, 69.9% C and 10.60% H; calculated for $C_{10}H_{18}O_2$, 70.55% C and 10.65% H.

*Example XVIII. Reactants: Methacrolein and vinyl butyl ether.*—Methacrolein and vinyl butyl ether reacted at 195° C. in 2 hours to form 2-(5-methyl-3,4-dihydro-1,2-pyranyl) butyl ether, having the structure

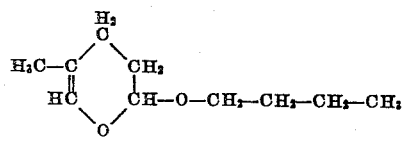

in a conversion of 31%. This ether distilled at 107° C. under a pressure of 50 mm. Hg and was found to have a refractive index ($n_D^{20}$) of 1.4448 and a specific gravity (20/4) of 0.9165. Analyses: found, 70.22% C and 10.68% H; calculated for $C_{10}H_{18}O_2$, 7.55% C and 10.65% H.

*Example XIX. Reactants: Methacrolein and methyl vinyl ether.*—Methacrolein and methyl vinyl ether, when reacted according to the method of Example II at 190° C. for 2 hours in the presence of 0.03% of hydroquinone, formed 2-(5-methyl-3,4-dihydro-1,2-pyranyl) methyl ether, distilling at 86° C. under a pressure of 100 mm. Hg, in a yield of 82% based on the methyl vinyl ether consumed and in a conversion of 21%. The methyl dihydropyranyl ether was found to have a refractive index ($n_D^{20}$) of 1.4462 and a specific gravity (20/4) of 0.9784. Analyses: found, 65.33% C and 9.42% H; calculated for $C_7H_{12}O_2$, 65.69% C and 9.44% H.

*Example XX.*—The reaction of acrolein with 3,4-epoxy-1-butene in the presence of hydroquinone, effected according to the method of the invention, forms in good yields 2-oxiranyl-3,4-dihydro-1,2-pyran, having the structure

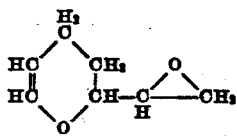

*Example XXI. Reactants: Acrolein and methacrylonitrile.*—Acrolein and methacrylonitrile, when reacted under the conditions employed in Example XIX, formed 2-cyano-2-methyl-3,4-dihydro-1,2-pyran distilling at 113° C. under a pressure of 100 mm. Hg, in a yield of 90% based on the methacrylonitrile consumed and in a conversion of 5%.

*Example XXII. Reactants: Acrolein and phenyl vinyl ether.*—A mixture of equimolar quantities of acrolein and phenyl vinyl ether containing 0.03% of hydroquinone was heated at 200° C. for 1 hour according to the method of Example II. Distillation of the resultant mixture led to the recovery of 2-(3,4-dihydro-1,2-pyranyl) phenyl ether, distilling at 90° C. to 96° C. under a pressure of 3 mm. Hg, in a yield of 53% based upon the consumption of acrolein and in a conversion of 51%. The dicyclic ether was found to have a refractive index $(n_D^{20})$ of 1.5372 and a density of 1.1022. Analyses: found, 74.75% C and 6.89% H; calculated for $C_{11}H_{12}O_2$, 74.97% C and 6.88% H.

*Example XXIII. Reactants: Acrolein and styrene.*—Acrolein and styrene, heated in an equimolar mixture according to the method of Example II for 1.5 hours at 155° C. in the presence of 1% of hydroquinone, formed 2-phenyl-3,4-dihydro-1,2-pyran (Product A) in a yield of 44% based upon the consumption of acrolein and in a conversion of 23%. There also was recovered in a yield of 26% based upon the acrolein consumed and in a conversion of 15%, the bicyclic compound 2-phenyl-2,3,4,4a,5,8a-hexahydro-1,8-dioxanaphthalene (Product B) apparently formed by the condensation of acrolein with the phenyldihydropyran that was obtained as the principal product of the experiment. Properties of these products were found to be as follows:

|  | Product A | Product B |
|---|---|---|
| Boiling point | 87° C. at 3.5 mm. Hg. 63° C. at 0.5 to 1.0 mm. Hg. | 140–142° C. at 0.02 mm. Hg. |
| Refractive index $(n_D^{20})$ | 1.5414 |  |
| Per Cent C, found | 81.9 | 77.90. |
| Per Cent C, calculated | 82.46 | 77.75. |
| Per Cent H, found | 7.5 | 7.47. |
| Per Cent H, calculated | 7.55 | 7.46. |

*Example XXIV. Reactants: Acrolein and alpha-methylstyrene.*—2-methyl-2-phenyl-3,4-dihydro-1,2-pyran, distilling at 70° C. under a pressure of 1.5 mm. Hg was prepared by reacting acrolein with alpha-methylstyrene at 180° C. for 1 hour in the presence of 1% of hydroquinone. Yield, 37% based on acrolein consumed; conversion, 23%. Analyses: found, 82.59% C, 8.12% H; calculated for $C_{12}H_{14}O$, 82.72% C and 8.10% H.

*Example XXV. Reactants: Crotonaldehyde and methylmethacrylate.*—A mixture of equimolar quantities of crotonaldehyde and methylmethacrylate containing 1% hydroquinone was heated for 4 hours at 200° C. according to the method of Example II. Distillation of the resultant mixture led to the recovery, in a conversion of 7%, of the methyl ester of 2,4-dimethyl-3,4-dihydro-1,2-pyran-2-carboxylic acid as the fraction distilling at 115° C. under a pressure of 50 mm. Hg. Analyses: found, 63.19% C and 8.25% H; calculated for $C_9H_{14}O_3$, 63.5% C and 8.10% H.

*Example XXVI. Reactants: Methyl vinyl ketone and alpha-methylstyrene.*—Methyl vinyl ketone and alpha-methylstyrene were reacted according to the method of Example II, at a temperature of 180° C. for 1 hour in the presence of 1% hydroquinone, and the resultant mixture was distilled. 2,6-dimethyl-2-phenyl-3,4-dihydro-1,2-pyran was recovered as the fraction distilling at 103° C. to 106° C. under a pressure of 1 mm. Hg, in a conversion of 22% and in a yield of 60% based on the amount of alpha-methylstyrene consumed.

It will be seen from the foregoing examples that a wide variety of olefinic compounds may be caused to react according to the process of the invention with alpha,beta-olefinically unsaturated aldehydes and ketones to form derivatives of 3,4-dihydro-1,2-pyran. Because of the greater efficacy with which the process of the invention may be executed and because of the particularly advantageous yields of the desired products that thereby may be obtained, it is preferred to employ in the process of the invention those alpha,beta-unsaturated aldehydes and ketones which contain at least one hydrogen atom attached to a carbon atom that is directly bonded by an olefinic bond to a carbon atom to which the carbonyl group is attached, i. e. those alpha,beta-olefinic aldehydes and ketones in which there is at least one hydrogen atom attached to an olefinic carbon atom that is in the beta position relative to the carbonyl carbon atom. These preferred unsaturated aldehydes and ketones may be defined as those aldehydes and ketones which contain the structural unit

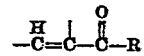

in which R has its previous significance. Under otherwise identical conditions, higher yields of the desired derivative of 3,4-dihydro-1,2-pyran, based upon the amount of the carbonylic reactant consumed, frequently may be obtained when there is only one hydrogen atom attached to the terminal olefinic carbon atom in this structural unit, i. e., when the free valency at this olefinic carbon atom is satisfied by a group or atom other than hydrogen, such as a hydrocarbon group. A highly preferred group of unsaturated aldehydes and ketones which may be employed in the process of the invention may be represented by the structural formula

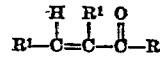

in which R has its previous significance and each $R^1$ represents either a hydrogen atom or a hydrocarbon group, preferably an alkyl, aryl, alkaryl, aralkyl, or cycloalkyl group. Because of their generally greater availability and their frequently lower cost, and also because of their suitability to use in the process to which the invention relates, the lower aliphatic aldehydes and ketones of the above-defined class, e. g., acrolein methacrolein, crotonaldehyde, alpha-ethylacrolein, methyl vinylketone, and their lower homologs, frequently may be employed with particular advantage. It is particularly preferred to employ the aliphatic mono-olefinic aldehydes which correspond in structure to the last given structural formula.

The hydrocarbon groups that may be represented by R and R¹ may be unsubstituted hydrocarbon groups, i. e., groups consisting of atoms of carbon and hydrogen, or they may be substituted hydrocarbon groups containing one or more atoms of elements other than carbon and hydrogen, such as one or more atoms of oxygen, sulfur, nitrogen, phosphorus, halogen, etc., provided the compound containing the thus substituted hydrocarbon groups is stable, i. e., does not decompose, unduly polymerize, isomerize to form an inoperable compound, or otherwise change undesirably under the conditions of the process, and provided the substituents are of such a character and in such a position in the molecule that they do not interfere in any way with the successful execution of the process of the invention. It generally is preferred to employ aldehydes and ketones defined by the foregoing formula in which the groups that may be represented by R and R¹ are unsubstituted hydrocarbon groups.

Unsaturated aldehydes and ketones which may be employed in the process of the invention in accordance with the generic concepts thereof include, among others, the following: acrolein, methacrolein, crotonaldehyde, alpha-methylcrotonaldehyde, methylethylacrolein, alpha-isopropylacrolein, alpha,beta-diisopropylacrolein, alpha-butylacrolein, alpha-hexyl-beta-cyclohexylacrolein, alpha-octylacrolein, alpha-octyl-beta-hexylacrolein, beta-cyclohexylacrolein, alpha-methyl-beta-cyclopentylacrolein, alpha-methylcyclohexylacrolein, alpha-phenylacrolein, beta-phenylacrolein, alpha, methyl-beta-phenylacrolein, 2,5-hexadien-1-al, beta-(2-cyclohexenyl) acrolein, alpha-phenethylacrolein, beta-tolylacrolein, alpha-methyl-beta-phenethylacrolein; methyl vinyl ketone, ethyl vinyl ketone, methyl isopropenyl ketone, 3-hexen-2-one, 3-methyl-3-hexen-2-one, 1-phenyl-3-penten-2-one, vinyl cyclohexyl ketone, 2-cyclohexen-1-one, 1,4-diphenyl-3-buten-2-one, vinyl isobutyl ketone, 2-hepten-4-one, phenyl vinyl ketone, the tolyl vinyl ketones, 3-phenyl-2-hexen-4-one, 4-methyl-2-cyclohexen-1-one, 5-ethyl-2-cyclohexen-1-one, and homologous and analogous aldehydes and ketones containing in their structure the foregoing structural unit.

A wide variety of olefinic compounds that are dissimilar to the unsaturated aldehydes and ketones of the herein defined class may be caused to react with the said aldehydes and ketones to form valuable and useful derivatives of 3,4-dihydro-1,2-pyran. In its broadest concepts, the invention is generic to the reaction and a method for effecting the reaction between alpha,beta-olefinic aldehydes and ketones and dissimilar olefinic compounds containing an isolated olefinic bond, to form derivatives of dihydropyran. Within the generic concepts of the invention, certain preferred embodiments exist. It thus has been discovered in accordance with the invention that the number of hydrogen atoms that is attached to the olefinic carbon atoms in the olefinic reactant that is caused to react with the unsaturated carbonylic reactant, and the position of the hydrogen atoms in the molecule, influence markedly the yields of and the conversions to derivatives of 3,4-dihydro-1,2-pyran that may be obtained under otherwise similar conditions in the process of the invention. The most favorable yields of and conversion to products of the desired character may be obtained when there is employed an olefinic reactant that has two hydrogen atoms attached to one of the olefinic carbon atoms. It thus is preferred to employ as the olefinic reactant a compound that is dissimilar (in the sense that has been explained hereinbefore) to the carbonylic reactant and that contains the unit

separated by at least one intervening atom from any additional olefinic and any acetylenic carbon atoms that the molecule may contain. The free valencies in this structural unit may be satisfied either by separate atoms or groups of atoms, or by different atoms in a cyclic group of atoms, as in a carbocyclic or heterocyclic ring. Among the numerous olefinic compounds that may be employed in the process of the invention are included those which form a preferred group represented by the formula

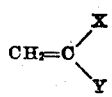

wherein X represents the hydrogen atom or a hydrocarbon group attached to the olefinic carbon atom in the formula through a saturated or an aromatic carbon atom, and Y represents a hydrogen atom, a hydrocarbon group, or a hydrocarbyloxy (OR*), acyloxy (—OOCR* and —OOCH), carbohydrocarbyloxy (—COOR*), hydrocarbylthio (—SR*), or cyano (—CN) group. In the foregoing R* represents a hydrocarbon group. The hydrocarbon groups that may be represented by X, Y, and R* may be either unsubstituted hydrocarbon groups or substituted hydrocarbon groups containing one or more atoms of elements other than carbon and hydrogen such as one or more atoms of oxygen, sulfur, nitrogen, phosphorus, halogen, etc., provided the compound containing the thus substituted hydrocarbon group or groups is stable, i. e., does not decompose, unduly polymerize, isomerize to form an inoperable compound, or otherwise change undesirably under the conditions of the process, and provided the substituents are of such a character and in such a position in the molecule that they do not interfere in any way with the successful execution of the process of the invention. It frequently may be desirable that the hydrocarbon groups that may be represented by X, Y, and R* be unsubstituted hydrocarbon groups. It is particularly preferred to employ those compounds wherein not more than one of X and Y represents a hydrogen atom.

The reaction which is effected in the process of the invention may be described by the following general equation employing, for illustration, certain of the preferred groups of reactants:

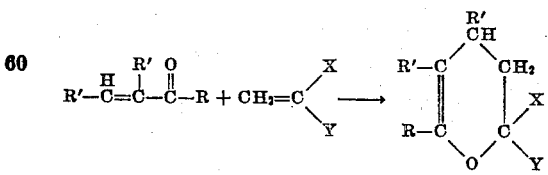

In this equation, R, R', X, and Y have their hereinbefore defined significance. Superficially, the reaction could be regarded as bearing a certain similarity to the well-known addition reaction frequently referred to by those skilled in the art as the Diels-Alder reaction, or the "diene synthesis," whereby various olefinic compounds may be reacted with various conjugated dienes to form, by 1,4-addition, carbocyclic compounds containing an unsaturated bond in the carbocyclic ring. However, certain significant differences between the reaction upon which the present invention is based and the so-called Diels-Alder reaction have been observed. One outstanding difference is that certain compounds, such as acrylonitrile, which add readily to conjugated dienes to form carbocyclic products in high yields, react with the alpha,beta-unsaturated aldehydes and ketones of the herein defined class to form substituted dihydropyrans in yields and conversions that are appreciably lower than those that would be predicted on the basis of analogy with the Diels-Alder reaction. On the other hand, certain compounds, such as methyl vinyl ether, which react with difficulty, if at all, with conjugated dienes, react very rapidly and easily with conjugated carbonylic compounds of the present class under the conditions of the present process to form substituted dihydropyrans in excellent yields and high conversion. A survey of the more likely literature sources has revealed no successful attempt to add vinyl ethers to conjugated dienes according to the well-known Diels-Alder reaction. In contrast to the apparent inability of such ethers to enter into the Diels-Alder reaction, by the process of the present invention they may be caused to react with alpha,beta-olefinic carbonylic compounds of the present class to form in high yields and conversions, approaching theoretical in some instances, heterocyclic products in the 3,4-dihydro-1,2-pyran series of compounds.

The process of the invention may be executed by mixing the unsaturated carbonylic reactant with the dissimilar olefinic reactant in suitable proportions and heating the mixture to and at a reaction temperature under conditions which minimize the polymerization of any polymerizable compound that is present, for sufficient time. The temperature that is employed should be sufficiently high to cause the desired reaction to take place, but not so high that excessive decomposition or other undesired side reactions occur. Temperatures of from about 100° C. to about 250° C. or higher are generally satisfactory, a preferred range being from about 150° C. to about 225° C. In the examples, the use of equimolar proportions of the two reactants is illustrated. Other proportions may be used, if desired. If either reactant is prone to polymerize excessively under the conditions of the process, it may be advantageous to provide a moderate excess of the other reactant in the reaction mixture, thereby favoring the desired condensation reaction and minimizing the undesired polymerization. Molar ratios between the unsaturated carbonylic reactant and the dissimilar olefinic reactant of from about 1:10 to about 10:1 may be employed, although it generally is preferable to employ molar ratios of from about 3:1 to 1:3. In certain cases excessive polymerization of either or both of the reactants may be prevented by suitable control of the conditions of temperature, time, and proportions of reactants under which the process is executed. Generally, however, it is desirable to include in the reaction mixture an effective amount of any of the known polymerization inhibitors, or antioxidants, that are effective in preventing, or minimizing the polymerization of ethylenically unsaturated compounds of the character herein employed. As illustrated in the examples, hydroquinone is eminently satisfactory for this purpose. However, the invention is not to be regarded as limited to the use of this specific polymerization inhibitor, since numerous materials which are known to be effective in inhibiting the polymerization of polymerizable unsaturated compounds may be employed in the process of the invention. Materials which may be employed to prevent, or minimize, polymerization of polymerizable ethylenically unsaturated compounds include, in addition to hydroquinone, other phenolic compounds, quinones, amines, nitroaryl compounds, alkylolamines, suitable inorganic compounds and/or elements, naturally occurring polymerization inhibitors, and the like. The phenolic compounds are particularly desirable. The phenolic compounds that may be employed are those that have one or more hydroxy groups attached to an aromatic nucleus, including, among others, the monohydric phenols such as phenol, the cresols, the xylenols, the naphthols, and polyhydric phenols, such as hydroquinone, resorcinol, pyrogallol, orcinol, guaiacol, etc. Additional polymerization inhibitors include amines, such as primary, secondary and, preferably, tertiary amines, e. g., mono-, di-, and tri-alkyl amines, aromatic amines, alkylolamines, nitrophenols, aminophenols, nitrosophenols, and the like. Suitable inorganic materials also are effective as polymerization inhibitors, such as elemental selenium, tellurium, and sulfur, as well as suitable organic compounds containing the same. The amount of the polymerization inhibitor that is employed most effectively in the process of the invention depends in part upon the particular reactants that are involved and the particular identity of the polymerization inhibitor, and in part upon the particular conditions that are employed. As illustrated in certain of the examples, the polymerization inhibitor may at times be omitted entirely without the excessive occurrence of polymerization or other undesired reactions. It is desired to employ such an amount of the polymerization inhibitor that formation of undesired polymers of either or both of the reactants that are employed in the process is substantially minimized. When hydroquinone is employed as the polymerization inhibitor, amounts of from about 0.01 per cent to about 10 per cent by weight of the reaction mixture are generally satisfactory, a preferred range being from about 0.01 per cent to about 5 per cent by weight of the reaction mixture. When polymerization inhibitors other than hydroquinone are employed, either greater or smaller amounts may be employed, depending upon the particular circumstances that are involved.

The process of the present invention is not known to be dependent upon the use of any catalyst for the desired reaction. Since the reactants which are employed in the process frequently may be readily polymerizable compounds, and because numerous materials are known to favor the polymerization of such polymerizable compounds, or because the presence of catalytically active materials may promote the excessive formation of products other than those that are desired, it is desirable to effect the reaction in the absence of any added material having catalytic activity. Inert solvents, such as saturated hydrocarbons, aromatic hydrocarbons, saturated ethers, esters, ketones, etc., may be included in the reaction mixture, if desired, as diluents, for purposes of maintaining a homogeneous liquid mixture, for purposes of facilitating regulation of the temperature of the reaction mixture, or for similar reasons. However, as illustrated in the examples, the process generally may be executed very effectively in the absence of any added solvent medium.

The process of the invention may be executed with the reactants in the gaseous state or, preferably, in the liquid state. The desired reaction preferably may be effected by heating the reaction mixture to a reaction temperature within the above-defined range under a pressure sufficient to maintain the mixture liquid. Such pressure may be either autogenous, as would arise in a closed reaction vessel from the vapor pressure of its contents, or it may be applied by introduction of a suitable gas, such as nitrogen, carbon dioxide, methane, hydrogen, or the like, into the reaction vessel in an amount sufficient to provide the desired pressure. The process may be executed either continuously, as by passing a liquid stream of a suitable mixture of the reactants containing the polymerization inhibitor, if one is employed, through a reaction tube heated to the desired temperature, or the process may be executed in a batchwise manner as illustrated in the examples. In either case, prolonged reaction times are not necessary, and desirably are avoided because of the possibility that excessive polymerization of either or both of the reactants may occur. Reaction times less than 5 hours are desirable, and reaction times of from about 30 minutes to about 2 hours are preferred.

Although numerous derivatives of dihydropyran may be prepared according to the present invention by a process that at least in its manipulative procedure may be similar in the several cases, it will be appreciated that the resultant products, by virtue of the groups that may be attached to dihydropyranyl ring, particularly at the 2-position thereof, may differ widely in their chemical characteristics, their fields of utility, etc. For example, certain of the compounds are of particular value as chemical intermediates. Many of the alkenyl and the aryl ethers of the 3,4-dihydro-1,2-pyran-2-ols have unexpected and desirable properties that render them highly valuable compounds. Others, such as the 2-alkyl-3,4-dihydro-1,2-pyrans wherein the alkyl group at the 2-position of the dihydropyran ring contains four or more atoms of carbon, are of particular value as plasticizers, as special solvents, etc. The esters of the 3,4-dihydro-1,2-pyran-2-ols have unusual chemical properties apparently due in part to the unique configuration of the olefinic bond, the heterocyclic oxygen atom, and the ester group, which render them of particular value in certain applications, as, for example, chemical intermediates.

In one of its preferred aspects, the present invention relates particularly to the preparation of and a method for the preparation of novel heterocyclic ethers in which at least one of the groups attached to the ethereal oxygen atom is a 2-(3,4-dihydro-1,2-pyranyl) group, the other group attaced to the ethereal oxygen atom being an organic monovalent group which may be either the same as or different from the 2-(3,4-dihydro-1,2-pyranyl) group. These novel ethers may be prepared according to the method of the invention by reacting an alpha,beta-unsaturated carbonylic compound of the hereindefined class with an organic ether wherein at least one of the groups attached to the ethereal oxygen atom is a vinylic group, i. e., an organic ether wherein the ethereal oxygen atom is bonded to at least one olefinic carbon atom to which there is directly attached a methylene group (CH₂=). Because of their availability, and the particularly desirable characteristics of the products that thereby are obtained, it is preferred to employ the vinyl ethers, i. e., the ethers wherein there is at least one vinyl group (CH₂=CH—) directly attached to the ethereal oxygen atom.

The novel heterocyclic ethers which form the subject matter of this more limited embodiment of the invention may be prepared by reacting an unsaturated carbonylic compound of the herein defined class with a vinylic ether according to the process of the invention to effect the reaction expressed in the following equation:

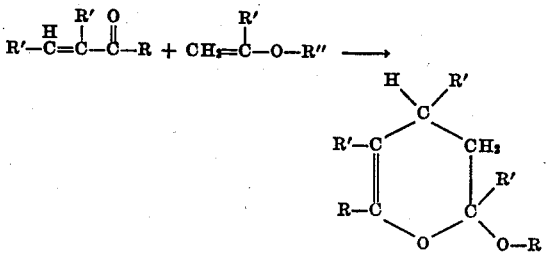

In this equation, R and R' have their previous significance. R" represents a monovalent organic group that is bonded to the adjoining ethereal oxygen atom by a carbon-to-oxygen univalent bond. The organic group that may be represented by R" may be composed solely of atoms of carbon and hydrogen, as in the unsubstituted hydrocarbon groups, or it may contain one or more atoms of elements other than carbon and hydrogen, such as one or more atoms of oxygen, nitrogen, sulfur, halogen, etc., as in the substituted hydrocarbon groups and the heterocyclic groups. It frequently may be desirable, because of their greater availability and because of the advantageous properties of the resultant products, to employ the vinyl ethers wherein R" represents an aliphatic hydrocarbon group, such as an alkyl group or an alkenyl group.

Heterocyclic ethers which are regarded as included within this preferred aspect of the invention include, among others, the following:

A. The 2 - (3,4 - dihydro - 1,2 - pyranyl) alkyl ethers such as:

2-(3,4-dihydro-1,2-pyranyl) methyl ether, which may be prepared by the reaction of acrolein with methyl vinyl ether 2-(3,4-dihydro-1,2-pyranyl) ethyl ether, which may be prepared by the reaction of acrolein with ethyl vinyl ether 2- (2 - methyl - 3,4-dihydro-1,2-pyranyl) methyl ether, which may be prepared by the reaction of acrolein with methyl isopropenyl ether 2 - (6-methyl - 3,4 - dihydro-1,2-pyranyl) methyl ether, which may be prepared by the reaction of methyl vinyl ketone with methyl vinyl ether 2-(3,4-dihydro-1,2-pyranyl) isobutyl ether, which may be prepared by the reaction of acrolein with isobutyl vinyl ether 2 - (5 - methyl - 3,4 - dihydro-1,2-pyranyl) propyl ether, which may be prepared by the reaction of methacrolein with propyl vinyl ether 2 - (5,6 - dimethyl - 3,4 - dihydro - 1,2-pyranyl) pentyl ether, which may be prepared by the reaction of methyl isopropenyl ketone with pentyl vinyl ether 2 - (3,4 - dihydro-1,2-pyranyl) octyl ether, which may be prepared by the reaction of acrolein with octyl vinyl ether 2 - (3,4 - dihydro - 1,2 - pyranyl) octadecyl ether, which may be prepared by the reaction of acrolein with octadecyl vinyl ether 2 - (4 - pentyl - 3,4-dihydro-1,2-pyranyl) methyl ether, which may be prepared by the reaction of 2-octen-1-al with methyl vinyl ether 2 - (6 - phenyl - 3,4 - dihydro - 1,2-pyranyl) ethyl ether, which may be prepared by the reaction of acrylophenone with ethyl vinyl ether 2 - (2,4 - dimethyl - 3,4-dihydro-1,2-pyranyl) isopropyl ether, which may be prepared by the reaction of crotonaldehyde with isopropyl isopropenyl ether B. The 2 - (3,4-dihydro - 1,2-pyranyl) alkenyl ethers, particularly 2-(3,4-dihydro-1,2-pyranyl) 1-alkenyl ethers, such as:

2-(3,4-dihydro-1,2-pyranyl) vinyl ether, which may be prepared by the reaction of acrolein with divinyl ether 2-(3,4-dihydro-1,2-pyranyl) allyl ether, which may be prepared by the reaction of acrolein with allyl vinyl ether 2 - (3,4 - dihydro - 1,2 - pyranyl) propenyl ether, which may be prepared by the reaction of acrolein with propenyl vinyl ether 2 - (3,4 - dihydro-1,2-pyranyl) isopropenyl ether which may be prepared by the reaction of acrolein with isopropenyl vinyl ether 2 - (6 - methyl - 3,4 - dihydro - 1,2-pyranyl) vinyl ether, which may be prepared by the reaction of methyl vinyl ketone with divinyl ether 2 - (4 - methyl - 3,4- dihydro - 1,2-pyranyl) vinyl ether, which may be prepared by the reaction of crotonaldehyde with divinyl ether 2 - (5 - methyl - 3,4 - dihydro - 1,2-pyranyl) vinyl ether, which may be prepared by the reaction of methacrolein with divinyl ether 2 - (4 - cyclohexyl-3,4-dihydro-1,2-pyranyl) vinyl ether, which may be prepared by the reaction of beta-cyclohexylacrolein with divinyl ether C. The 2-(3,4-dihydro-1,2-pyranyl) aryl ethers, such as:

2-(3,4-dihydro-1,2-pyranyl) phenyl ether, which may be prepared by the reaction of acrolein with phenyl vinyl ether 2-(3,4-dihydro-1,2-pyranyl) tolyl ethers, which may be prepared by the reaction of acrolein with the tolyl vinyl ethers 2-(6-methyl-3,4-dihydro - 1,2 - pyranyl) phenyl ether, which may be prepared by the reaction of methyl vinyl ketone with phenyl vinyl ether 2-(4-methyl-6-octyl-3,4-dihydro - 1,2 - pyranyl) phenyl ether, which may be prepared by the reaction of octyl propenyl ketone with phenyl vinyl ether 2-(3,4-dihydro - 1,2 - pyranyl) naphthyl ether, which may be prepared by the reaction of acrolein with naphthyl vinyl ether D. The bis-2-(3,4-dihydro-1,2-pyranyl) ethers, particularly the symmetrical bis-2-(3,4-dihydro-1,2-pyranyl) ethers, such as:

Bis-2-(3,4-dihydro - 1,2 - pyranyl) ether, which may be prepared by the reaction of two molecules of acrolein with one molecule of divinyl ether.

Bis-2-(6-methyl-3,4-dihydro-1,2-pyranyl) ether, which may be prepared by the reaction of two molecules of methyl vinyl ketone with one molecule of divinyl ether.

Bis-2-(5-methyl-3,4-dihydro-1,2-pyranyl) ether, which may be prepared by the reaction of two molecules of methacrolein with one molecule of divinyl ether Bis-2-(4-methyl-3,4-dihydro-1,2-pyranyl) ether, which may be prepared by the reaction of two molecules of crotonaldehyde with one molecule of divinyl ether 2-(3,4-dihydro-1,2-pyranyl) 2-(6-methyl-3,4-dihydro-1,2-pyranyl) ether, which may be prepared by the reaction of acrolein with 2-(6-methyl-3,4-dihydro-1,2-pyranyl) vinyl ether or, alternatively, by the reaction of methyl vinyl ketone with 2-(3,4-dihydro-1,2-pyranyl) vinyl ether.

Because of the availability of the raw materials that are necessary for their preparation, and because of their particularly desirable characteristics, a highly valuable group of 2-(3,4-dihydro-1,2-pyranyl) ethers comprises the 2-(monoalkyl-3,4-dihydro-1,2-pyranyl) alkyl ethers, i. e., the ethers when R represents the hydrogen atom, one R' represents an alkyl group and the others represent hydrogen atoms, and R" represents an alkyl group.

According to the present invention, these and analogous and homologous 2-(3,4-dihydro-1,2-pyranyl) ethers may be converted by treatment with suitable polymerization catalysts under conditions which favor polymerization reaction, to improved and useful resinous and other polymeric products. The invention is regarded as including the preparation of polymers from the 2-(3,4-dihydro-1,2-pyranyl) ethers of the present class as the sole polymerizable material, and the preparation of copolymers of an ether of the herein described class with a polymerizable olefinic compound that contains a vinyl radical

$$CH_2=CH—$$

or a substituted vinyl radical

Polymerizable olefinic compounds which may be employed with the 2-(3,4-dihydro-1,2-pyranyl) ethers to obtain novel copolymers include, for example, the vinyl esters of aliphatic carboxylic acids, vinyl halides, vinylidene halides, vinyl ethers, vinyl acetals, polymerizable hydrocarbons containing a vinyl group, and the acrylic and the substituted acrylic acids, esters, amides and nitriles.

The preferred ethers of the present class, for the preparation of polymers and copolymers, have a hydrogen atom in position 6 of the dihydropyran ring.

Polymerization of the herein described 2-(3,4-dihydro-1,2-pyranyl) ethers may be accomplished by treating the ether with an effective amount of a polymerization catalyst under polymerization conditions. Preferred catalysts comprise the acidic condensation catalysts of the well-recognized type that is effective as a catalyst in the Friedel-Crafts reaction. Catalysts of this type include aluminum chloride, boron trifluoride, zinc chloride, titanium tetrachloride, ferric chloride, hydrofluoric acid, sulfuric acid, phosphoric acid, antimony pentachloride, and the like. The preferred catalysts are boron trifluoride, aluminum chloride and zinc chloride.

The invention is not limited to the use of any particular amounts of catalyst or of any particular conditions of temperature, time, and the like, other than those that are required to effect the desired polymerization reaction. It will be understood that a wide variety of conditions may be employed without exceeding the broad limits of the invention. Within the ranges of operable conditions numerous desirable modifications in the characteristics of the polymers to which the invention relates can be accomplished by suitable regulation of the conditions under which the polymerization process is executed.

It is desired to employ an amount of the polymerization catalyst sufficient to effect the desired polymerization reaction but insufficient to affect undesirably the characteristics of the resultant polymer or otherwise to impair the effectiveness of the polymerization process. Only small amounts of the catalyst usually are required, a generally satisfactory range comprising amounts of the polymerization catalyst from about 0.002 to about 10%, preferably from about 0.01 to about 5%, by weight of the polymerizable monomer. The catalyst may be added to the monomeric dihydropyranyl ether either in the solid state or dissolved in a suitable solvent, such as a lower aliphatic alcohol, an ether, a hydrocarbon, etc., the selection of the solvent for the catalyst being one that readily can be made by those who are skilled in the art to which the invention pertains. The catalyst may be added either all in one portion, or it may be added in several portions over a period of time and during the course of the polymerization process.

Polymerization of the novel ethers to which the invention pertains, alone or with other polymerizable materials, may be effected by treating the monomeric ether or a mixture of the monomeric ether with the other polymerizable material or materials, in bulk, in solution in a suitable solvent, or in emulsion form. Because of a possible sensitivity of the present ethers to the action of excessive amounts of water, the polymerization desirably is effected under substantially anhydrous conditions, as in bulk polymerization or in polymerization in an organic solvent medium. The temperature at which the polymerization is effected may be varied within a considerable degree of latitude. However, it generally is desirable to employ moderately elevated temperatures, such as from about 40° C. to about 150° C., preferably from about 60° C. to about 100° C. The pressure during the polymerization process may be any suitable pressure. Since the present novel ethers generally are relatively high-boiling materials, the use of approximately atmospheric pressures is usually satisfactory. Higher pressures may be employed if it is so desired, and if a component of the polymerization mixture is excessively volatile such higher pressures may be advantageous in reducing its volatilization from the mixture. Sub-atmospheric pressures also may be employed, although no particular advantages generally are to be obtained thereby.

For most purposes it generally is advantageous and highly convenient to effect the polymerization of the herein described ethers in bulk or in a suitable organic solvent medium, e. g., a hydrocarbon, an ester, an ether, a petroleum solvent, etc. The dihydropyranyl ether, alone or mixed with a polymerizable vinylic compound to be copolymerized therewith, thus may be treated with an effective amount of the polymerization catalyst at a suitable temperature. Additional quantities of the catalyst may be added during the polymerization process. When the polymerization reaction has proceeded to the desired extent, the reaction may be halted by separating the catalyst from the mixture by any applicable method, e. g., adsorption, chemical precipitation, dialysis, extraction, etc., or by removing the mixture from conditions of temperature, etc. which favor the polymerization reaction. The polymer may be purified by removal of any materials associated therewith as by evaporation or distillation of monomer and/or solvent therefrom, by treatment with selective solvents, by fractional precipitation from solution, or by similar methods.

Particularly valuable and desirable polymers may be prepared by polymerization of the 2-(3,4-dihydro-1,2-pyranyl) ethers of the present class which have structures defined by the formula

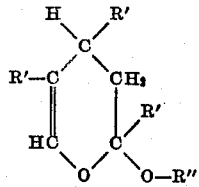

when each R' represents the hydrogen atom or a lower alkyl group, and R'' represents an aliphatic hydrocarbon group.

Polymers may be prepared according to the invention which range from viscous liquids to hard resin-like solids. By suitable regulation of the conditions under which the polymerization is effected, a wide variety of useful products may be prepared. The invention also includes modification of the properties of the polymers that may be produced, by copolymerization of the dihydropyranyl ethers with one or more of the polymerizable ethylenically unsaturated compounds of the characters hereinbefore referred to. The lower polymers which may be obtained according to the invention, i. e., the liquid to soft-solid polymers, appear to be of particular value in applications wherein a potential tackiness is of value, such applications includes use in the arts of adhesives, of paper treatment, e. g., impregation, lamination, etc., and as binders for other fibrous compositions. The polymers to which the invention relates are useful as modifiers of other compositions comprising resins and like plastic products, and in this manner may be employed advantageously as ingredients in resin-base varnishes, in lacquers containing cellulose derivatives, in inks, in molding compositions, and in like products.

The following examples will illustrate certain of the polymers and their preparation as they are provided by the broader aspects of the invention that is defined in the appended claims.

*Example XXVII.*—One thousand parts of 2-(3,4-dihydro-1,2-pyranyl) isobutyl ether were placed in a glass-lined reaction vessel equipped with internal coils through which heating and cooling media could be circulated. A solution of 1 part of zinc chloride in 10 parts of ether was added, and the mixture was heated to 90° C. for 30 minutes. An additional equal amount of zinc chloride in ether was added and the heating was continued for an additional hour. A third, equal amount of zinc chloride in ether then was added and the mixture was maintained at 90° C. for 16 more hours. At the end of this time, the mixture had been converted to a viscous, light yellow syrup having a refractive index of 1.4748. The syrup was dissolved in 2000 parts of isopropanol and 100 parts of water were added. The solution was treated with an anion exchange resin to remove the chloride and then evaporated at 100° C. under a pressure of 0.1 mm. Hg. There were obtained 940 parts of a clear, slightly yellow polymer that flowed only slowly at room temperatures. The polymer was soluble in ethyl alcohol, carbon tetrachloride, chloroform, benzene, and petroleum ether, and insoluble in water.

*Example XXVIII.*—To 316 parts of freshly distilled 2-(3,4-dihydro-1,2-pyranyl) methyl ether there were added 0.3 part of a 5% solution of BF₃ in diethyl ether. There occurred a mild rise in temperature. The temperature was maintained at 40° C. by occasional cooling. After about 2 hours the temperature had decreased to about 35° C. The addition of a further 0.1 part of the BF₃ solution again caused moderate heating. The temperature was maintained at about 40° C. for another two hours. The mixture was allowed to stand overnight. The resultant colorless viscous syrup was dissolved in two volumes of benzene, the solution was treated with 10 parts of an anion-exchange synthetic resin to remove the polymerization catalyst, filtered, and the benzene was removed by distillation under reduced pressure. The product remaining after removal of the solvent was heated one hour at 150° C. under 0.5–1.0 mm. Hg pressure. There were obtained 214 parts (68% conversion) of a light yellow, brittle, non-tacky, solid polymer.

*Example XXIX.*—2-(3,4-dihydro-1,2-pyranyl) vinyl ether was treated at room temperatures with 0.4% by weight of zinc chloride dissolved in ether to form a 10% solution. The resultant solution was heated at 110° C. for 18 hours. There was obtained a brittle solid polymer.

*Example XXX.*—Treatment of 2-(3,4-dihydro-1,2-pyranyl) isobutyl ether with 0.1% of iodine at 40° C. formed a dark syrup of medium viscosity.

*Example XXXI.*—Bis-2-(3,4-dihydro-1,2-pyranyl) ether was converted to a hard, brittle, light-orange solid polymer when treated with zinc chloride according to the method of Example XXVIII. 2-(4-methyl-3,4-dihydro-1,2-pyranyl) methyl ether formed in 42 hours when treated with zinc chloride in a similar manner, a viscous syrup which flowed only slowly at room temperatures.

We claim as our invention:

1. As a new chemical compound, 2-(3,4-dihydro-1,2-pyranyl) methyl ether.

2. As new chemical compounds, the ethers represented by the formula

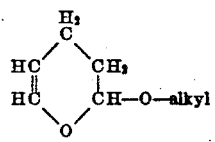

3. As a new chemical compound, a 2-(3,4-dihydro-1,2-pyranyl) alkenyl ether.

4. As a new chemical compound, 2-(3,4-dihydro-1,2-pyranyl) vinyl ether.

5. As a new chemical compound, an ether having a structure represented by the formula

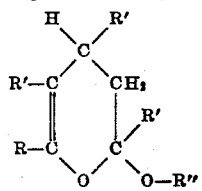

in which R and R' represent members of the group consisting of the hydrogen atom and the hydrocarbon radicals and R" represents a hydrocarbon radical.

6. As a new chemical compound, a 2-(monoalkyl-3,4-dihydro-1,2-pyranyl) alkyl ether.

7. As a new chemical compound, an ether according to claim 5 when R represents an atom of hydrogen.

8. Process of producing 2-(3,4-dihydro-1,2-pyranyl) methyl ether comprising reacting acrolein with methyl vinyl ether at a reaction temperature between about 100° C. and about 250° C. in the liquid state in the presence of a polymerization inhibitor.

9. Process of producing an alkyl ether of 3,4-dihydro-1,2-pyran-2-ol comprising reacting acrolein with a vinyl alkyl ether at a reaction temperature between about 100° C. and about 250° C. in the liquid state in the presence of a polymerization inhibitor.

10. Process of producing 2-(3,4-dihydro-1,2-pyranyl) methyl ether comprising heating a liquid mixture of acrolein and methyl vinyl ether containing a minor amount of hydroquinone at a reaction temperature between about 100° C. and about 250° C.

11. Process of producing an ether of 3,4-dihydro-1,2-pyran-2-ol comprising reacting acrolein with an organic ether wherein at least one of the groups attached to the ethereal oxygen atom is a vinyl group at a reaction temperature between about 100° C. and about 250° C. in the liquid state in the presence of a polymerization inhibitor.

12. Process for producing a 2-(3,4-dihydro-1,2-pyranyl) ether comprising reacting an aliphatic alpha,beta-olefinically unsaturated aldehyde with an organic ether wherein at least one of the organic groups attached to the ethereal oxygen atom is a vinyl group in the liquid state at a reaction temperature between about 100° C. and about 250° C. in the presence of a polymerization inhibitor.

13. A process which comprises reacting an aliphatic alpha,beta-unsaturated aldehyde with an organic ether wherein at least one of the organic groups attached to the ethereal oxygen atom is a vinylic group in the liquid state at a reaction temperature between about 100° C. and about 250° C. to produce a 2-(3,4-dihydro-1,2-pyranyl) ether.

14. Process of producing a 2-(3,4-dihydro-1,2-pyranyl) ether comprising reacting an aliphatic alpha,beta-olefinically unsaturated ketone with an organic ether wherein at least one of the organic groups attached to the ethereal oxygen atom is a vinyl group in the liquid state at a reaction temperature between about 100° C. and about 250° C. in the presence of a polymerization inhibitor.

15. A process which comprises reacting an unsaturated carbonylic compound of the group consisting of the alpha,beta-olefinically unsaturated aldehydes and ketones with an organic ether wherein at least one of the organic groups attached to the ethereal oxygen atom is a vinylic group in the liquid state at a reaction temperature between about 100° C. and about 250° C. to produce a 2-(3,4-dihydro-1,2-pyranyl) ether.

16. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom, with a compound having a structure represented by the formula $$CH_2=C\begin{matrix}X\\Y\end{matrix}$$

in which X represents a member of the group consisting of the hydrogen atom and the hydrocarbon groups so selected that the olefinic bond in said formula is non-conjugate to aliphatic carbon-to-carbon unsaturation, and Y represents a member of the group consisting of the hydrogen atom, the hydrocarbon groups so selected that the olefinic bond in said formula is non-conjugate to aliphatic carbon-to-carbon unsaturation the hydrocarbyloxy, acyloxy, carbohydrocarbyloxy, hydrocarbylthio, and cyano groups, at a reaction temperature between about 100° C. and about 250° C. in the liquid state while substantially minimizing polymerization of the reactants.

17. The method according to claim 16 when the unsaturated carbonylic compound is acrolein.

18. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom with a dissimilar organic compound that contains a vinyl group the olefinic linkage of which is non-conjugate to aliphatic carbon-to-carbon unsaturation by heating in liquid state a mixture of said unsaturated carbonylic compound and said dissimilar organic compound while substantially minimizing polymerization of the reactants.

19. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom, with a mono-olefinic unsaturated hydrocarbon in which the olefinic bond is the only aliphatic carbon-to-carbon unsaturation by heating in liquid state at a temperature between about 100° C. and about 250° C. a mixture of said unsaturated carbonylic compound and said mono-olefinic unsaturated hydrocarbon while substantially minimizing polymerization of the reactants.

20. The method of preparing derivatives of dihydropyran comprising reacting an unsaturated aldehyde wherein the carbonylic carbon atom is directly attached by a univalent bond to an olefinic carbon atom, with a mono-olefinic unsaturated ester of a carboxylic acid with an alcohol, in which the olefinic bond is the only aliphatic carbon-to-carbon unsaturation, by heating in liquid state at a temperature between about 100° C. and about 250° C. a mixture of said unsaturated carbonylic compound and said unsaturated ester in the presence of a polymerization inhibitor.

21. The method according to claim 20 when the ester is an ester of methacrylic acid with a saturated alcohol.

22. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom, with a dissimilar unsaturated organic compound containing two carbon atoms that are directly interconnected by an olefinic carbon-to-carbon bond that is non-conjugate to aliphatic carbon-to-carbon unsaturation by heating a mixture of said unsaturated carbonylic compound and said dissimilar unsaturated organic compound at a temperature between about 100° C. and about 250° C. while substantially minimizing polymerization of the reactants.

23. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom, with a dissimilar unsaturated organic compound containing two carbon atoms which are directly interconnected by an olefinic carbon-to-carbon bond that is non-conjugate to aliphatic carbon-to-carbon unsaturation by heating in liquid state a mixture of said unsaturated carbonylic compound and said dissimilar unsaturated organic compound in the presence of a polymerization inhibitor.

24. The method of preparing derivatives of dihydropyran comprising reacting an unsaturated carbonylic compound of the group consisting of the aldehydes and ketones wherein the carbonylic carbon atom is directly attached by a univalent bond to an olefinic carbon atom, with a dissimilar unsaturated organic compound containing two carbon atoms which are directly interconnected by an olefinic carbon-to-carbon bond that is non-conjugate to aliphatic carbon-to-carbon unsaturation by heating in liquid state a mixture of said unsaturated carbonylic compound and said dissimilar unsaturated organic compound while substantially minimizing polymerization of the reactants.

25. A polymer of 2-(3,4-dihydro-1,2-pyranyl) methyl ether.

26. A polymer of 2-(3,4-dihydro-1,2-pyranyl) alkyl ether.

27. A polymer of a 2-(3,4-dihydro-1,2-pyranyl) aliphatic ether.

28. Process of producing polymers which comprises polymerizing a 2-(3,4-dihydro-1,2-pyranyl) alkyl ether by contacting said ether with a Friedel-Crafts condensation catalyst.

29. Process of producing polymers which comprises polymerizing an organic ether wherein at least one of the groups attached to the ethereal oxygen atom is a 2-(3,4-dihydro-1,2-pyranyl) group by contacting said ether with a Freidel-Crafts condensation catalyst.

30. A polymer of an organic ether that in its monomeric form contains at least one 2-(3,4-dihydro-1,2-pyranyl) group directly attached to an ethereal oxygen atom.

CURTIS W. SMITH.
DOUGLAS G. NORTON.
SEAVER A. BALLARD.

REFERENCES CITED

The following references are of record in the file of this patent:

FOREIGN PATENTS

| Number | Country | Date |
|---|---|---|
| 558,106 | Great Britain | Dec. 21, 1943 |

OTHER REFERENCES

Woods et al.: Jr. Amer. Chem. Soc., Dec. 1946, pages 2483 to 2485.
Chem. & Eng. News, Jan. 20, 1947, page 169.
Cass: "Industrial and Engineering Chemistry," Feb. 1948, page 219.